United States Patent [19]

Rukavina et al.

[11] Patent Number: 6,110,327

[45] Date of Patent: Aug. 29, 2000

[54] PRIMER FOR PROMOTING ADHESION OF ELECTROCONDUCTIVE METAL OXIDE TO PLASTIC SUBSTRATES

[75] Inventors: Thomas G. Rukavina, Verona; Robert M. Hunia, Kittanning, both of Pa.

[73] Assignee: PPG Industries Ohio, Inc., Cleveland, Ohio

[21] Appl. No.: 09/415,442

[22] Filed: Oct. 8, 1999

Related U.S. Application Data

[62] Division of application No. 08/743,875, Nov. 5, 1996, Pat. No. 5,994,452.

[51] Int. Cl.[7] .............................. C23C 14/02; C23C 14/35
[52] U.S. Cl. .................. 204/192.1; 204/192.14; 427/322; 427/383.1; 427/393.5; 427/404; 427/412.1; 427/419.5; 427/419.7
[58] Field of Search .............................. 204/192.1, 192.14; 427/322, 383.1, 393.5, 404, 412.1, 419.5, 419.7

[56] References Cited

U.S. PATENT DOCUMENTS

| | | |
|---|---|---|
| 4,094,763 | 6/1978 | Gillery et al. . |
| 4,113,599 | 9/1978 | Gillery . |
| 4,335,187 | 6/1982 | Rukavina et al. . |
| 4,434,284 | 2/1984 | Rukavina et al. . |
| 4,435,450 | 3/1984 | Coleman . |
| 4,554,318 | 11/1985 | Rukavina . |
| 4,609,703 | 9/1986 | Rukavina . |
| 4,610,771 | 9/1986 | Gillery . |
| 4,622,120 | 11/1986 | Gillery . |
| 4,670,350 | 6/1987 | Rukavina . |
| 4,725,501 | 2/1988 | Rukavina et al. . |
| 4,731,289 | 3/1988 | Coleman . |
| 4,857,407 | 8/1989 | Coleman et al. . |
| 4,904,526 | 2/1990 | Koskenmaki . |
| 5,178,966 | 1/1993 | Gillery . |
| 5,776,548 | 7/1998 | Rukavina et al. . |
| 5,840,429 | 11/1998 | Rukavina et al. . |

FOREIGN PATENT DOCUMENTS

| | | |
|---|---|---|
| 0 355 424 | 2/1990 | European Pat. Off. . |
| 0 720 249 | 7/1996 | European Pat. Off. . |

OTHER PUBLICATIONS

Anonymous, "Research Disclosure", *Low Molecular (Meth) Acrylic Copolymers*, Jun. 1995. p. 366.

Union Carbide "Cycloaliphatic Epoxide Systems" informational brochure bearing copyright dates 1970, 1976, 1978, 1987, 1989 (28 pages).

*Primary Examiner*—Patricia A. Short
*Attorney, Agent, or Firm*—Kenneth J. Stachel

[57] ABSTRACT

The present invention relates to primer for promoting adhesion of an electroconductive metal oxide coating over a plastic substrate, to a method of making such a primer, and to a method of adhering an electroconductive metal oxide coating to a plastic substrate. The primer is a carbonate diol-based crosslinked polyurethane, and is more particularly the reaction product of a carbonate diol, a low molecular weight polyol and methylene diisocyanate.

3 Claims, 1 Drawing Sheet

PRIMER FOR PROMOTING ADHESION OF ELECTROCONDUCTIVE METAL OXIDE TO PLASTIC SUBSTRATES

This is a divisional of U.S. patant application Ser. No. 08/743,875, filed Nov. 5, 1996, now U.S. Pat. No. 5,994,452

CROSS REFERENCE TO RELATED APPLICATIONS

U.S. patent application Ser. No. 08/743,867 filed even date in the name of Thomas G. Rukavina and Robert M. Hunia for "Improved Aircraft Transparency" now U.S. Pat. No. 5,840,429 and U.S. patent application Ser. No. 08/743,874 filed even date in the name of Thomas G. Rukavina and Robert M. Hunia for "Primer For Promoting Adhesion Of Polyurethane To A Metal Oxide Coating" now U.S. Pat. No. 5,776,548, are related to the instant application.

BACKGROUND

1. Field of the Invention

The present invention relates to primer for adhering an electroconductive metal oxide coating to a plastic substrate, to a method of making the primer, and to a method of adhering an electroconductive metal oxide coating to a plastic substrate.

2. Description of the Related Art

Plastic substrates encompass an important part of a vast variety of articles of manufacture. Such substrates include cast acrylics, stretched acrylics, polyurethane and polycarbonates, among others. Also included are laminates having one or more plastic outer surfaces, which laminates may include multiple layers of materials other than plastic, e.g. glass, laminated with plastic. Many applications require adhering a conductive metal oxide coating to the plastic surfaces for a variety of applications. For example, in the aircraft industry metal oxide coatings are bonded to plastic substrates to provide aircraft transparencies which are able, among other things, to melt ice and remove moisture from the aircraft transparency.

Efforts have been made to adhere various materials, including metals and metal oxides, to plastic surfaces.

U.S. Pat. No. 4,335,187 to Rukavina et al. discloses a metal retainer, e.g. a stainless steel retainer, for mounting an aircraft transparency to an aircraft body, which retainer is bonded to polycarbonate, e.g. the polycarbonate inboard ply of the transparency, by a polyurethane adhesive.

U.S. Pat. No. 4,435,450 to Coleman discloses applying abrasion resistant thin polyurethane coatings to polycarbonate based aircraft transparencies with crosslinked aliphatic polycarbonate urethane coatings applied from solutions of a prepolymer and a crosslinking agent which are flow or dip coated onto the substrate.

U.S. Pat. Nos. 4,554,318; 4,609,703 and 4,670,350 to Rukavina disclose copolymers of acrylic acid and cyanoethylacrylate for bonding indium oxide films to acrylic substrates. Also disclosed is a terpolymer of cyanoethylacrylate, acrylic acid and hydroxyethylacrylate for the same purpose.

U.S. Pat. No. 4,725,501 to Rukavina discloses a silicate/titanate copolymer for use as a primer to adhere a vinyl interlayer to stretched acrylic or indium/tin oxide coated stretched acrylic substrate.

Other combinations of metal oxides and methods for applying them to a substrate are described in U.S. Pat. Nos. 4,094,763; 4,113,599; 4,434,284; 4,610,771; 4,622,120; 4,904,526 and 5,178,966.

While various approaches and compositions to satisfactorily adhere a number of materials to plastic substrates are disclosed and are acceptable, there are limitations. More particularly, separation of the metal oxide coating from a substrate may be caused by poor adhesion and/or the stress of unequal expansion and contraction of the metal oxide coating with respect to the substrate. Even minor separation is generally undesirable for most applications.

As can be appreciated from the foregoing, it would be advantageous to provide a primer composition for promoting adhesion of a metal coating to a substrate that does not have the limitations of the presently available primers.

SUMMARY OF THE INVENTION

The present invention relates to a primer for adhering metals (e.g. gold), metal nitrides (e.g. titanium nitride), and particularly electroconductive metal oxide coatings (e.g. indium oxide, tin oxide and mixtures thereof) respectively to a plastic substrate; a method for making the primer; and a method for adhering the metal, metal nitride or electroconductive metal oxide coating to a plastic substrate. While the primer may be used to adhere metals, metal nitrides and metal oxides to a plastic substrate, for the sake of brevity the primer shall hereinafter be referred to as a "metal oxide primer". The metal oxide primer of the instant invention includes a carbonate diol-based crosslinked polyurethane. More particularly, it is a reaction product of a carbonate diol, a low molecular weight polyol and polymeric methylene diisocyanate (hereinafter "MDI"). The metal oxide primer of the instant invention imparts a flexibility which reduces or inhibits the effects of stress on the metal, metal nitride or electroconductive metal oxide coating, provides good adhesion of the metal, metal nitride or metal oxide coating to the substrate without undesirable distortion of light, and has a low coefficient of expansion. In one preferred embodiment of the invention, the index of refraction of the metal oxide primer matches or nearly matches that of the substrate to eliminate undesirable optical effect of scratches, minor surface irregularities and the like on the substrate surface. The metal oxide primer of the instant invention also resists swelling due to contact with solvents which can contact the metal oxide primer by passing through defects in the metal, metal nitride, metal oxide or other coatings disposed over the metal oxide primer. The metal oxide primer is particularly effective in adhering indium/tin oxide coating to a substrate, particularly those coatings having a ratio of indium oxide to tin oxide of about 9:1.

DESCRIPTION OF THE DRAWING

The drawing is a side elevational view of a cross section of a substrate showing the metal oxide primer of the present invention adhering a metal oxide coating to a substrate.

DESCRIPTION OF THE PREFERRED EMBODIMENTS

Figure 1:
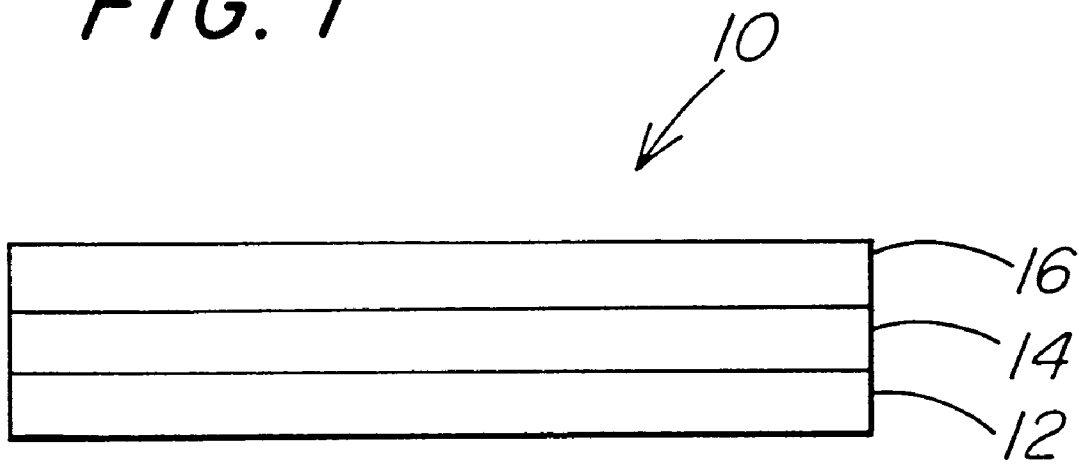

The present invention relates: to a novel primer for adhering a metal, a metal nitride or an electroconductive metal oxide coating over a plastic substrate; to a method for making the same; and to a method for adhering a metal, metal nitride or electroconductive metal oxide coating to a plastic substrate. While the metal oxide primer of the instant invention may be used with metals, metal nitrides and/or metal oxide coatings, the discussion herein is directed to its use with metal oxide coatings, and in particular indium/tin oxide coatings, e.g. those having a ratio of indium oxide to tin oxide of about 9:1.

Referring to FIG. 1, there is shown a cross section of a laminate 10 having a metal oxide primer 14 of the instant invention interposed between and adhering a substrate 12 to a metal oxide coating 16.

I. THE SUBSTRATE

The substrate of the present invention is preferably, but not limited to, a monolithic plastic or a laminate which has a plastic surface. The substrate may be rigid or flexible, transparent or opaque. In the following discussion, the invention will be discussed with reference to a plastic substrate; however, as can be appreciated, the invention is not limited thereto and in the practice of the invention, it is preferable to use a substrate that is preferably either plastic or if not plastic, has a plastic surface.

The plastic substrate may include cast acrylics, a biaxially oriented crosslinked polymethylmethacrylate, also known as a stretched acrylic, polyurethanes and polycarbonates, among others.

Examples of polycarbonate substrates include polycarbonate polyurethanes, bisphenol A polycarbonate. Other substrates include substrates made from monomers of allyl diglycolcarbonate such as those available under the trademark "CR-39" from PPG Industries, Inc. of Pittsburgh, Pa.

As may be appreciated, the thickness of the substrate may vary over a broad range depending upon its application. Typically a stretched acrylic substrate (as opposed to a laminate of more than one substrate material) has a thickness of about 0.125 to 1 inch (about 3 to 25 millimeters) for many applications. A polycarbonate typically has a thickness of about 0.001 inch to 1 inch (0.025 to 25 mm) for most applications. As can now be appreciated, the invention is not limited to the thickness of the substrate and the substrate may be of any thickness.

II. THE METAL OXIDE PRIMER

The metal oxide primer of the invention preferably has:
(1) a coefficient of expansion in the range between the coefficient of expansion of the substrate and the coefficient of expansion of the metal oxide coating to prevent buckling of the metal oxide coating in compressive stress;
(2) an elastic modulus that is higher than the elastic modulus of the substrate to prevent buckling and cracking of the primer with the expansion and contraction of the substrate;
(3) good adhesion to the substrate;
(4) good adhesion to the metal oxide coating;
(5) a refractive index that is within ±2% of the refractive index of the substrate. When the refractive index of the metal oxide primer is within that range as the metal oxide primer fills surface irregularities (e.g. surface scratches present on the surface of the substrate) during its application, the filled surface irregularities are rendered no longer visible rendering acceptable a substrate which might otherwise be objectionable for optical applications due to the presence of such surface irregularities; and
(6) sufficient adhesion to maintain the metal oxide coating on the substrate when the article is subjected to temperature ranges of −65° F. to 230° F. (−53.9° C. to 110° C.) Also, for many applications, it is desirable the metal oxide coating remain adhered to the substrate even under moist/wet conditions. Accordingly, it is preferred that the primer of the instant invention permit the metal oxide coating to survive a 30–day 105° F. (40.6° C.) 100% humidity Cleveland Condensing Cabinet Humidity Test. The Cleveland Condensing Cabinet Humidity Test is discussed in more detail below.

The metal oxide primer should permit the metal oxide coating to survive strains of up to 1.0% which include the total of applied bending strains plus thermally induced expansion or compression strains. The preferred method of measuring strain is discussed below.

The metal oxide primer preferably used in the practice of the invention is a thermoset high modulus polymer which is a good film former, and is transparent and colorless. More particularly, the metal oxide primer of the present invention is a carbonate diol-based crosslinked aromatic polyurethane. It is a reaction product of a carbonate diol, a low molecular weight polyol and an isocyanate composition. Low molecular weight polyol is defined herein as a polyol having a molecular weight of less than about 300 g/mole. These reactants are combined in a solvent. The reaction mixture may also include in addition to the foregoing, a catalyst and/or a surfactant. The reaction mixture is referred to hereinafter as "the metal oxide primer composition". Each of the components of the metal oxide primer composition is discussed in detail below.

II. A. THE CARBONATE DIOL

The carbonate diol preferred in the practice of the invention is a high molecular weight polyol, having a molecular weight of about 1000 g/mole and functions to extend the length of crosslinks formed in the metal oxide primer which in turn imports more flexibility to the metal oxide primer to allow the absorption of more shear stress to prevent the metal oxide coating from buckling or cracking. The carbonate diol may include either a hexanediol-cyclohexanedimethanol-based carbonate diol or may simply include a hexanediol-based carbonate diol. The carbonate diol of the present invention may have the general formula:

(Formula 1)

where a is an integer from 2 to 9, preferably 4, and where each R group in Formula 1 is independently —(CH$_2$)$_b$—, where b is an integer from 2 to 8, preferably 6, or

A suitable hexanediol-cyclohexandimethanol-based carbonate diol includes KM-10-1667 available from Stahl, Inc. of Boston, Mass., having the following formula:

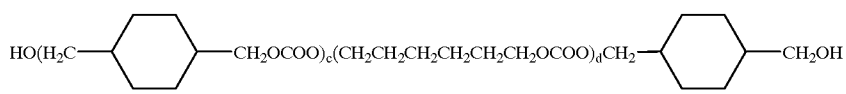
(Formula 2)

where c and d are independently integers from 1–6, and c and d are preferably each 3.

Where a more flexible primer is desired, some or all of the carbonate diol may be a hexanediol-based carbonate diol instead of one which includes the cyclohexane-based groups. A suitable hexanediol-based carbonate diol is one having the formula:

HO (CH$_2$CH$_2$CH$_2$CH$_2$CH$_2$CH$_2$OCOO)$_e$CH$_2$CH$_2$CH$_2$
CH$_2$CH$_2$CH$_2$OH.  (Formula 3)

where e is an integer from 2 to 13, preferably 6.

Although the invention contemplates but is not preferred in the practice of the invention, the cyclohexane-based diol component may be replaced completely with an aliphatic straight chained based carbonate diol. This is not preferred because where the carbonate diol is comprised only of aliphatic straight chained diols the metal oxide primer may become too flexible and the coefficient of expansion of the primer will substantially outstrip that of the metal oxide coating causing the metal oxide coating bonded to the metal oxide primer to crack as the metal oxide primer expands or contracts. Preferably not more than half the carbonate diol will be comprised of hexanediol-based carbonate diols.

II. B. THE LOW MOLECULAR WEIGHT POLYOL

The low molecular weight poliol is a compound of the general formula $C_fH_{(2f+2-g)}$ (OH)$_g$ (formula 4) having a molecular weight of less than about 300 grams per mole, where f is an integer from 4–18, and g is an integer independently selected from 3–12. Preferably f is an integer from 5–7 and g is an integer from 3–6. The low molecular weight polyol may include an aliphatic triol having a molecular weight of 100–300, however any low molecular weight aliphatic polyol having more than two hydroxyl groups may be used. A preferred low molecular weight polyol is trimethylolpropane. Pentaerythritol is a satisfactory substitute for trimethylolpropane.

II. C. THE ISOCYANATE COMPOSITION

Polymeric MDI exists in several isomers. Further, polymeric MDI may include products which contain more than two aromatic rings in the molecule, such as 3- and higher ring compounds. Thus polymeric MDI may be a mixture of many chemical individuals, and consequently polymeric MDI is offered commercially as a wide variety of products having a wide variety of molecular weights ranging from polymers including the pure 4,4'-two ringed product to products including all of the MDI isomers.

The polymeric MDI preferably used in the present invention may be represented more or less generically by the following Formula 5:

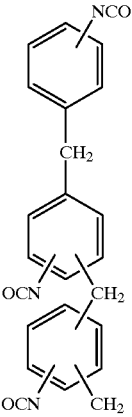
(Formula 5)

wherein the NCO groups and methylene groups,(—CH$_2$—), may be in any position on the phenyl ring, although as may be appreciated, an NCO group and a methylene group will not be in the same position on the same phenyl ring.

The polymeric MDI of the present invention may alternatively be described as an alternating polymer of the series:

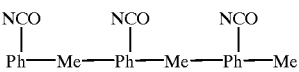
(Formula 6)

where Ph is phenyl and Me is methylene, and each of the phenyl groups includes an NCO group bonded thereto. As with the generic formula set forth above, each of the NCO groups and methylene groups may be envisioned as being in any position on the phenyl groups, although as may be appreciated, an NCO group and a methylene group will not be in the same position on the phenyl ring.

One polymeric MDI which may be used in the preparation of the novel metal oxide primer of the present invention is a product of Bayer Corporation of Pittsburgh, Pa., available under the trade name "MONDUR MR".

Typical molecular weights of polymeric MDI products are generally at least about 460 grams per mole. Polymeric MDI products having molecular weights of about 1000 grams per mole are preferred.

II. D. THE SOLVENT

In the practice of the invention, the solvent is organic and does not cause visible degradation of the substrate surface. Particularly when the substrate is a bisphenol-A polycarbonate, a solvent can visibly degrade the surface of the substrate by partial dissolution of the substrate surface. The solvents of the instant invention are selected in part, with solubility parameters which are different from those of the substrate, whereby the solvents of the instant invention do not cause visible degradation of the substrate surface. The solvent of the metal oxide primer of the present invention is preferably selected from tertiary alcohols, ketones and ethers. Tertiary alcohols include diacetone alcohol, t-butanol, and t-pentanol. Ketones include cyclohexanone and cyclopentanone. Ethers include butylether. Mixtures of these solvents are also contemplated by the instant invention. The preferred solvent is diacetone alcohol.

II. E. THE CATALYST

Although not required but preferred in the practice of the invention is the use of a catalyst to promote the reaction of the isocyanate of the polymeric MDI with the hydroxyl groups of the carbonate diol and the hydroxyl groups of the low molecular weight polyol to yield a urethane. Stannous octoate and butyl stannic acid are acceptable catalysts. The preferred catalyst is dibutyltindilaurate.

II. F. THE SURFACTANT

Although not required but preferred in the practice of the invention, a surfactant may be used which functions as a flow control agent. When the metal oxide primer is applied to a substrate, visible distortion may result from individual pockets of primer which are formed by gradients in the surface tension of the primer. The surfactant lowers the surface tension of the primer, allowing the primer to flow together to form a uniform film on the substrate surface. A suitable surfactant includes a fluorinated nonionic surfactant manufactured by 3M Corporation of St. Paul, Minn., available under the trade name "FC430". Another suitable surfactant includes silicone surfactants sold under the trade name "BYK300" or BYK306 manufactured by Byk-Chemie of Germany.

II. G. THE RATIOS OF THE COMPONENTS

The ratios of the various components of the metal oxide primer of the present invention are as follows.

The ranges in wt % of the carbonate diol, polyol and polymeric MDI are set forth below in Table 1. These weight percent ranges assume that the carbonate diol has an equivalent weight of about 380 to 500 grams per equivalent. Equivalent weight is defined as grams of polymer per equivalent of hydroxyl groups present in the primer.

It is possible to use carbonate diols in the instant invention which have equivalent weights above or below the range of 380 to 500 grams per equivalent as defined and set forth above. However, as will be appreciated by those skilled in the art, other carbonate diol equivalent weights require a minor adjustment in the weight percent ranges shown in Table 1, (namely an adjustment in the ratios of weight percents of the polyol and carbonate diol) in order to obtain the metal oxide primer of the instant invention having the same thermomechanical properties such as glass transition temperature, elastic modulus and coefficient of expansion as is obtained from the carbonate diols having equivalent weights of 380 to 500 grams per mole. For example, where the equivalent weight of carbonate diol is above 500 g per equivalent, more polyol and less carbonate diol is required. When the equivalent weight of carbonate diol is below 380, more carbonate diol and less polyol will be required.

The weight percents shown in Table 1 are the solids contents by weight percent for the three solid components, (namely the carbonate diol, the polyol and polymeric MDI) in the metal oxide primer composition. The solids content is defined as that portion of the metal oxide primer composition other than the solvent or trace components (e.g. catalyst and/or surfactant).

TABLE 1

| SELECTED METAL OXIDE PRIMER COMPOSITION COMPONENTS | WEIGHT % BASED ON PRIMER COMPOSITION SOLIDS CONTENT |
|---|---|
| Carbonate Diol | 18.65–18.76 wt % |
| Polyol | 18.68–19.10 wt % |
| Polymeric MDI | 62.24–62.57 wt % |

With regard to the polymeric MDI, carbonate diol and low molecular weight polyol, for each equivalent of polymeric MDI, it is desirable to have about the same number of hydroxyl groups (combined from the hydroxyl groups present in the carbonate diol and low molecular weight polyol) as NCO groups in the polymeric MDI, that is a ratio of about 1±0.1 NCO groups to total hydroxyl groups in the metal oxide primer composition. Therefore, in accordance with the present invention, there is preferably for each equivalent of NCO groups in the polymeric MDI, about 0.9 to 1.1 equivalents of a combined total of hydroxyl groups in the metal oxide primer composition comprised of the hydroxyl groups present in the low molecular weight polyol and hydroxyl groups present in the carbonate diol.

The individual equivalent of the low molecular weight polyolls hydroxyl groups is preferably about 0.9 equivalents, preferably 0.9±0.1 equivalents, and the individual equivalent of the carbonate diol's hydroxyl groups is preferably at least 0.05 equivalents, preferably about 0.05 to 0.15 equivalents, more preferably about 0.1 equivalents.

Excess carbonate diol will result in a metal oxide primer which has an undesirably high coefficient of expansion and an undesirably low glass transition temperature such that when the primer expands or contracts, it does so at a rate that is much faster than the metal oxide coating causing the metal oxide coating to buckle or crack.

Insufficient carbonate diol will result in a metal oxide primer that has an insufficient coefficient of expansion resulting in high stress development in the primer as the substrate expands or contracts at a rate exceeding that of the primer which is transmitted to the metal oxide coating causing the metal oxide coating to crack.

Excess polyol has the same effect as insufficient carbonate diol on the primer. Insufficient polyol has the same effect as excess carbonate diol on the primer.

In a preferred embodiment, the novel primer of the present invention is a urethane defined as having a molecular weight per crosslink (designated "$M_c$") of about 276 grams per mole to 411 grams per mole, preferably about 340.3 grams per mole and a weight percent of urethane of about 24 wt % to 32 wt %, preferably about 27.5 wt % based on one equivalent of urethane group having an equivalent weight of 59 grams per equivalent.

The amount of catalyst present is in the range of bout 0–600 ppm, preferably about 100 ppm of solids content in the metal oxide primer composition. As may be appreciated by those skilled in the art, the amount of surfactant necessary to sufficiently reduce surface tension will vary with the specific surfactant chosen. When the surfactant is FC430, it is preferred that at least 0.05 weight percent by weight of the metal oxide primer composition be used.

II. H. THE MIXING OF THE COMPONENTS II.A–F

In one embodiment of the present invention, the carbonate diol, low molecular weight polyol and polymeric MDI are blended and mixed in the solvent in the range of about 1 to 20 wt %. solids content A catalyst and/or a surfactant may be added. The reactants are blended to form the metal oxide primer composition. The components of the metal oxide primer composition are permitted to react until upon application to the substrate a clear polymeric film will form which has acceptable optical properties. Typically this reaction time is 2 hours at room temperature but can be accelerated with increased catalyst, increased solids contents or heat.

After the metal oxide primer composition is prepared in accordance with either of the above described embodiments, the metal oxide primer composition is applied to the substrate surface as a solution by dip, spin, spray, flow or other conventional application technique, after cleaning the substrate surface with hexane and methanol, as follows: First hexane is wiped over the substrate with a soft lint-free cloth and the surface is allowed to dry. Second, the surface is similarly wiped with methanol and is again allowed to dry. Static may be removed from the surface of the substrate before application of the metal oxide primer composition as for example by the use of an antistatic gun.

After the metal oxide primer composition is applied to the cleaned substrate, it is allowed to air dry at room temperature until tack free. The solvent is then evaporated and the primer composition is cured at slightly elevated temperature, that is, above ambient temperature to promote crosslinking and to form the crosslinked metal oxide primer of the instant invention. A temperature in the range of about 230° F.–265° F. (110° C.–129.4° C.) for approximately 1 to 2 hours, preferably two hours will suffice for curing.

II. J. PROPERTIES OF THE METAL OXIDE PRIMER

The thickness of the metal oxide primer after cure is preferably in the range of about 0.5 to 10 microns, more preferably about 1.5 to 3 microns for optimum stress reduction and adhesion of the electroconductive metal oxide coating. The metal oxide primer has a glass transition temperature (Tg) of at least 230° F. (110° C.), preferably about 248° F. (1200° C.). It has a molecular weight per crosslink of 276 to 411 g/mole, and a weight percent content of urethane of about 24 to 32 wt % It also has a refractive index of about 1.5555 to 1.6155, preferably about 1.5855.

The metal oxide primer of the instant invention mitigates the effects of stress on the electroconductive coating caused by different coefficients of expansion between the metal oxide coating and the substrate. More particularly, the metal oxide primer acts as a shear-absorbing layer to reduce shear stress on the metal oxide coating.

The metal oxide primer permits the metal oxide coating to withstand strains of up to 1%. Strain may be measured by any known techniques, but preferably is measured as follows. A 1"×6" bisphenol A polycarbonate substrate, coated with the metal oxide primer of the instant invention and a metal oxide coating, has laminated to the metal oxide coating a pair of bus bars at opposite ends of the substrate.

The substrate is placed with the metal oxide coated bus bar "front" surface facing downwardly, over a pair of end supports located at opposite ends of the substrate, said supports being positioned more or less under the bus bars. A bending force is applied to the "backside" of the substrate by applying a downward force perpendicular to the substrate near the midpoint of the backside of the substrate between the two end supports, to bend the substrate between the supports, thereby inducing a radius of curvature in the substrate and providing a bending strain.

The temperature of the coated substrate may be raised or lowered during the bending process to induce a thermal expansion or compression strain to determine the ability of the metal oxide coating to withstand strain as a function of temperature.

Force is applied until an increase in the resistance between the bus bars of about 10% is obtained over the initial resistance prior to bending. This 10% increase in resistance has been found by the inventors to be indicative of the formation of microcracks in the metal oxide coating.

From a measured or calibrated radius of curvature corresponding to the amount of force applied, the temperature, and the coated substrate composition and thickness, the % strain may be calculated. Coatings are deemed to have sufficient ability to withstand strain where they withstand strains of up to about 1% total strain with less than a 10% increase in resistance. Total strain includes bending strain plus thermal compression or expansion strains.

The metal oxide primer of the present invention also provides good water resistance and good adhesion of the electroconductive layer to the substrate as determined by subjecting samples to a 140° F. (60° C.) 100% Humidity Cleveland Condensing Cabinet Humidity test for up to six months, whereupon it was found by periodic scribe tape testing of samples taken during the Cleveland Condensing Cabinet Humidity Test, that no loss of adhesion was observed.

The Cleveland Condensing Cabinet Humidity Test includes supporting samples on a rack-type system within a closed Cleveland Condensing Cabinet manufactured by Q-Panel Corporation of Cleveland, Ohio, wherein the humidity and temperature and time of exposure to aforesaid humidity and temperature can be controlled. Scribe tape testing includes cutting the coating on a substrate into squares by scribing with a razor knife, followed by pressing a suitable adhesive tape against the coating and pulling the adhesive tape at approximately a 90° angle to the surface of the coating in an effort to delaminate the coating from the substrate. The scribe tape test is described in ASTM 03359-93 hereby incorporated by reference herein.

Further, in the preferred embodiment of the present invention, the index of refraction of the metal oxide primer matches that of the substrate, which permits the metal oxide primer to fill surface irregularities in the substrate, causing such surface irregularities to become invisible to the optically unaided eye permitting the use of substrates which are other than optically perfect.

Further, the metal oxide primer of the present invention has an important advantage stemming from its ability to resist solvents. More particularly, where additional coatings are applied in a solvent, such as a polyurethane protective liner applied in a solvent, over the metal oxide coating, the solvent of such additional coatings can penetrate through defects in the metal oxide coating and undesirably swell certain primers, resulting in cracking of the metal oxide coating. The metal oxide primer of the instant invention is able to withstand such solvent contact without deformation or dimensional change and/or solvent-induced loss of adhesion of the metal oxide coating or primer. The metal oxide primer of the present invention is excellent at resisting such solvent-induced degradation.

Further, the metal oxide primer of the present invention may be used in a wider role as a barrier film (with or without a metal oxide coating disposed thereon) to protect the substrate to which it is adhered from chemical attack from any number of overlying materials or environmental sources. For example, a polyvinyl butyral interlayer could be disposed over the metal oxide primer, wherein the metal oxide primer acts as a barrier film to block migration of plasticizer of the polyvinyl butyral to the substrate, which plasticizer would otherwise damage a polycarbonate substrate over which the metal oxide primer is disposed.

III. THE ELECTROCONDUCTIVE METAL OXIDE COATING

The electroconductive metal oxide coating may be placed on the metal oxide primer by any conventional known technique. Preferred techniques include magnetron sputtering vacuum deposition (hereinafter "MSVD" ) and/or the cathode sputtering methods of Gillery disclosed in U.S. Pat. No. 4,094,763, which is incorporated herein by reference in its entirety. See also U.S. Pat. Nos. 4,113,599; 4,610,771; 4,622,120, and 5,178,966 for additional procedures which may be used to apply metal oxide, particularly indium/tin oxide coatings or similar electroconductive coatings over the metal oxide primer on a rigid plastic substrate. The metal oxide primer of the present invention is particularly well suited to adhere coatings of indium oxide, tin oxide, or mixtures thereof and is particularly useful for metal oxide coatings comprising a ratio of indium to tin oxide of about 9:1 commonly applied by MSVD.

In the practice of the invention the metal oxide coating is indium/tin oxide, preferably has at least 3 ohms/sq. resistance and preferably is less than about 13,000 Å thick. A preferred metal oxide coating has a resistance of about 3 to 40,000 ohms/sq. and a thickness about 1400 to 13,000 Å. A particularly preferred metal oxide coating has a resistance of about 10 ohms/sq. and a thickness of about 7500 Å to maintain the metal oxide coating on the substrate through temperature ranges of about −65° F. to +230° F. (−53.9° C. to 110° C.).

The following are examples of the primer of the invention; however, as can be appreciated, the invention is not limited thereto.

EXAMPLE 1

In this example, a polycarbonate substrate was primed with a metal oxide primer and coated with an indium/tin oxide coating as follows. The metal oxide primer included carbonate diol, a low molecular weight polyol and polymeric MDI blended as shown in Table 2 below:

TABLE 2

| Component | Hydroxyl Equivalents | Isocyanate Equivalents | Wt % by Weight Solids Content |
|---|---|---|---|
| Carbonate Diol (KM-10-1667 - molecular weight of about 1000 grams per mole) | 0.1 | 0.0 | 18.73 |
| Polyol (trimethylolpropane) | 0.9 | 0.0 | 18.76 |
| Polymeric MDI | | 1.0 | 62.5 |

Persons skilled in the art will appreciate that the ratio of components as shown in Table 2 is such that there is one isocyanate equivalent of polymeric MDI for one hydroxyl equivalent, with the hydroxyl equivalent representing the total of the hydroxyl groups contributed by the KM-10-1667 carbonate diol and the hydroxyl groups contributed by the trimethylolpropane low molecular weitght polyol.

More particulary 18.73 grams of KM-10-1667 carbonate diol, 18.76 grams trimethylolpropane low molecular weigth polyol, and 62.5 grams polymeric MDI were blended and mixed in 300 grams of diacetone alcohol solvent to form a 25% solids content solution which was reacted for 2 hours. After hours, 600 grams of diacetone alcohol was added to dilute to a 10% solids content, along with .01 gram dibutyltindilaurate as a catalyst and 0.05 gram of FC430 as a surfactant were blended until thoroughly mixed to form a metal oxide primer composition.

A substrate Lexan™, a polycarbonate material available from General Electric of Pittsfield, Mass., measuring about 6 feet in length by about 4 feet in width by about ½ inch thick was cleaned by wiping with hexane and a lint free cloth followed by cleaning with methanol and wiping with a lint free cloth. The metal oxide primer composition was flow-coated to a thickness of about 2 microns onto the cleaned Lexan™ substrate and cured in air for two hours at 230° F. (110° C.) to form a metal oxide primer on the Lexan™ substrate. The metal oxide primer had a molecular weight per crosslink of 340.3 g/mole, a molecular weight between branch points of 228 g/mole and a urethane content of 27.5% by weight. The refractive index of the metal oxide primer was 1.5855 which nearly matched the refractive index of the Lexan™ substrate which was about 1.5850. The metal oxide primer exhibited a glass transition temperature of 248° F. (120° C.) as measured by a Torsional Braid Analyzer manufactured by Plastics Instruments, Inc. of Princeton, N.J.

A 10 ohms/square resistance coating of indium/tin oxide was applied by magnetic sputtering vacuum deposition (MSVD)to the primed substrate at a substrate temperature of 180° F. (32° C.). The thickness of the indium/tin oxide coating was 7500 Angstroms.

The substrate/metal oxide primer/metal oxide coating article thus formed was subjected to a 5-day 176° F. (80° C.) 100% humidity Cleveland Condensing Cabinet Humidity Test and was checked for cracking on a daily basis by cutting samples and conducting visual and microscopic inspection of the samples. No cracking of the metal oxide coating was observed during the 5-day 176° F. (80° C.) 100% humidity Cleveland Condensing Cabinet Humidity Test, showing that the metal primer of the present invention maintained the mechanical integrity and adhesion of the metal oxide coating to the substrate.

COMPARATIVE EXAMPLE 1

The following Comparative Example 1 demonstrates that where a substrate is coated with a metal oxide primer and metal oxide coating, wherein the polymeric MDI of the metal oxide primer of the instant invention is replaced entirely by an all-aliphatic substitute (a known crosslinking agent, but having an index of refraction which does not match the refractive index of the substrate), the resultant comparative metal oxide primer did not prevent the metal oxide coating from buckling and cracking. More particularly, the comparative metal oxide primer results in cracking of the metal oxide coating as it cools to room temperature from the temperature at which the metal oxide coating was applied of about 180° F. (82.2° C.) 13.53 g of KM-10-1667 carbonate diol was mixed with 13.55 g trimethylolpropane low molecular weight polyol and 72.92 g of an all-aliphatic substitute, namely triisocyanurate of hexanediisocyanate available under the trade name Desmodur 3300 available from Bayer of Pittsburgh, Pa. A 25% solids content solution of the above carbonate diol, polyol and all-aliphatic substitute was made in diacetone alcohol. 300 ppm of dibutyltindilaurate by weight of solids content in the comparative primer composition was added as a catalyst. The reactants were allowed to react for 2 hours at 230° F. (110° C.), then the solution was diluted with diacetone alcohol to a 10% solids content to form a comparative metal oxide primer composition.

The comparative metal oxide primer composition was flow coated onto a bisphenol A polycarbonate substrate and cured for 2 hours at 230° F. (110° C.). An indium/tin oxide coating was vacuum deposited onto the comparative metal oxide primer composition at a thickness of 7500 Å with a resistance of about 10 ohms/sq. and at a substrate temperature of about 180° F. (82.2° C.). The comparative metal oxide primer had a weight % urethane content of 21.4% and a molecular weight per crosslink of 438 grams per mole.

Four hours after cooling to room temperature the indium/tin oxide coating cracked. The comparative metal oxide primer is assumed to have had a coefficient of expansion which was too high whereupon the rate of contraction of the metal oxide primer upon cooling exceeded the strain limit of the indium/tin oxide coating, causing the indium/tin oxide coating to crack.

Various modifications are included within the scope of the invention, which is defined by the following claims.

We claim:

1. A method of adhering a coating selected from the group consisting of metal coatings, metal nitride coatings and electroconductive metal oxide coating to a plastic substrate comprising the steps of:

a. providing a plastic substrate, wherein said substrate is selected from the group consisting of polycarbonate polyurethane, bis phenol-A polycarbonate, polyether carbonate and stretched acrylic;

b. cleaning said substrate by wiping said substrate with hexane and methanol;

c. directing a carbonate diol-based polyurethane primer composition onto the surface of a plastic substrate by a process selected from the group consisting of dipping, spraying, spinning or flowing said primer composition onto the surface of said plastic substrate;

d. air drying said primer composition at room temperature until sufficient solvent has evaporated to render said primer composition tack free;

e. curing said primer composition at a temperature of at least 230° F. (110° C. ) for approximately 1 to 2 hours whereupon crosslinking will occur to form a crosslinked primer on said substrate; and f. applying said coating over said primer, wherein said primer adheres said coating to said substrate.

2. The method of claim 1 wherein said coating is an electroconductive metal oxide coating applied by magnetron sputtering vacuum deposition and is selected from the group consisting of indium oxide, tin oxide and mixtures thereof, said electroconductive metal coating having a resistance of at least 3 ohms/square and a thickness of less than about 13000 Angstroms.

3. The method of claim 2 wherein said primer has a glass transition temperature of at least 230° F. (110° C.) , a molecular weight per crosslink of about 276 to 411 grams per mole, a urethane content of about 24 to 32 weight percent, a refractive index that is ±2% of the refractive index of the substrate, a coefficient of expansion between the coefficient of expansion of the substrate and the coefficient of expansion of the electroconductive metal oxide coating, and wherein said primer enables said electroconductive metal oxide coating to withstand a strain of up to 1% without buckling or cracking of said electroconductive metal oxide coating.

* * * * *